United States Patent [19]

Yarrow et al.

[11] Patent Number: 5,509,684

[45] Date of Patent: Apr. 23, 1996

[54] VEHICLE SUSPENSION TORQUE ARM ASSEMBLY

[75] Inventors: Nigel S. Yarrow, Coventry; Neil F. Milburn, Studley; Malcolm J. Burgess, Coventry, all of England

[73] Assignee: Rover Group Limited, Birmingham, England

[21] Appl. No.: 517,072

[22] Filed: Aug. 21, 1995

Related U.S. Application Data

[63] Continuation of Ser. No. 150,477, Nov. 10, 1993, abandoned.

[30] Foreign Application Priority Data

Nov. 11, 1992 [GB] United Kingdom .................... 9223618

[51] Int. Cl.⁶ ..................................................... B60G 11/02
[52] U.S. Cl. ........................... 280/720; 267/260; 280/718
[58] Field of Search .................................... 280/720, 718; 267/30, 260, 269, 271

[56] References Cited

U.S. PATENT DOCUMENTS

| 2,582,775 | 1/1952 | Giacosa. | |
| 4,744,587 | 5/1988 | Veneau. | |
| 4,758,019 | 7/1988 | Tucker-Peake et al. | 280/718 |
| 4,768,807 | 9/1988 | McGibbon et al. | 267/269 |
| 4,889,361 | 12/1989 | Booher | 280/720 |
| 4,988,080 | 1/1991 | Shah | 267/30 |
| 5,129,672 | 7/1992 | Hiromoto et al. | 280/720 |

FOREIGN PATENT DOCUMENTS

| 1-105029 | 4/1989 | Japan | 267/260 |
| 791523 | 3/1958 | United Kingdom. | |
| 1229649 | 4/1971 | United Kingdom. | |
| 2255611 | 11/1992 | United Kingdom. | |

OTHER PUBLICATIONS

Range Rovers Owners Workshop Manual, Haynes Publishing Group 1982, 1985, 1987, England.

*Primary Examiner*—Eric D. Culbreth
*Attorney, Agent, or Firm*—Davis, Bujold & Streck

[57] ABSTRACT

In a vehicle having a chassis, an axle and a pair of laterally spaced torque arm assemblies connecting the axle to the chassis and arranged longitudinally of the vehicle, each torque arm assembly includes a composite resin/glass fiber arm which has one end pivotally attached to the a chassis and which is attached to the axle at a first bolt by an end fitting. A clamp assembly is clamped to the arm along a length of the arm spaced from the end fitting and is fastened to the axle at a second bolt spaced from the first bolt. Cushioning between the clamp assembly and the arm is provided by rubber pads. The two torque arm assemblies produce an anti-roll effect by the bending of each arm in opposite directions during cornering or traversing uneven surfaces.

24 Claims, 6 Drawing Sheets

VEHICLE SUSPENSION TORQUE ARM ASSEMBLY

This application is a continuation of application Ser. No. 08/150,477 filed on Nov. 10, 1993 now abandoned.

The invention relates to vehicle suspension torque arm assemblies and to vehicles incorporating such assemblies. Such assemblies react braking and/or driving torque and are highly stressed components, particularly in four wheel drive vehicles intended for off-road use.

U.S. Pat. No. 2,582,775 shows a vehicle having a chassis, an axle and a pair of laterally spaced torque arm assemblies connecting the axle to the chassis and arranged longitudinally of the vehicle. However, the torque arm assemblies shown comprise in one example leaf springs and in another example tapered rods. For modern vehicles, the leaf springs have insufficient durability whereas the tapered rods are unable to combine flexibility and strength.

A known torque arm assembly for off-road vehicles uses a steel forging which is not only heavy but also needs resilient bushings to mount the assembly on the axle and allow the required articulation. These bushings have considerable compliance and thus have a negligible anti-roll effect.

It is an object of the invention to provide a vehicle torque arm assembly which overcomes the disadvantages of the prior art assemblies.

According to the invention there is provided a suspension torque arm assembly for a vehicle having a chassis, an axle and a pair of laterally spaced torque arm assemblies connecting the axle to the chassis and arranged longitudinally of the vehicle, each torque arm assembly comprising a composite arm having one end arranged for pivotal attachment to the vehicle chassis, an end fitting at the other end of the arm for attaching the arm to the axle at a first position on the axle and a clamp assembly clamped to the arm so as to apply a clamp load to the arm along a length of the arm spaced from the end fitting and arranged to be fastened to the axle at a second position on the axle spaced from the first position.

Preferably, resilient cushioning is provided between the clamp assembly and the arm, for example pads of elastomeric material which are preferably bonded to the arm.

Conveniently, the clamp assembly comprises a first, U-section, clamp member having a base portion to apply the clamp load to the arm and a pair of side flanges, a second clamp member nesting between the side flanges and having a base surface for reacting the clamp load and retaining means to resist lateral movement between the flanges and the second clamp member and thus retain the clamp load.

A through bore may be provided in the side flanges and the second clamp member for a fastener connecting the torque arm to the axle at said second position.

The side flanges may extend to flank the end fitting so that in use the clamp assembly is fastened to the axle at said first position, in which case the side flanges may be connected to the end fitting.

The end fitting preferably includes a resilient bushing for providing resilience between the end fitting and the axle, in which case a rigid sleeve may be provided to extend through the side flanges and the resilient bushing and provide a hole for a fastener which in use connects the torque arm to the axle at said first position. The rigid sleeve may be captive in the torque arm assembly, for example by virtue of an interference fit.

Other aspects of the invention will be apparent from the following description which is by way of example and is with reference to the accompanying drawings, of which:

Figure 1:
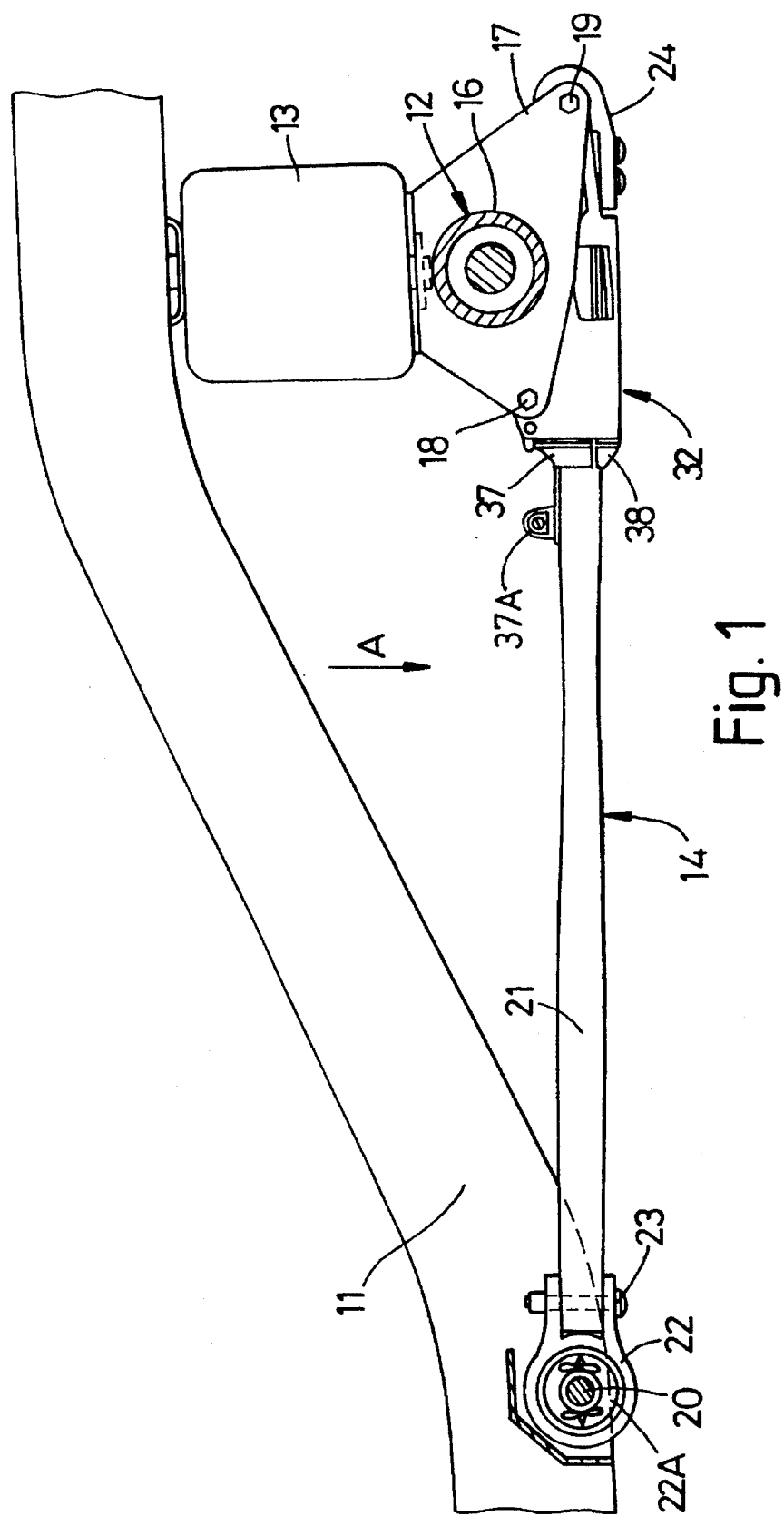
FIG. 1 is a side elevation of part of a motor vehicle chassis and axle showing a suspension torque arm assembly according to the invention.
Figure 2:
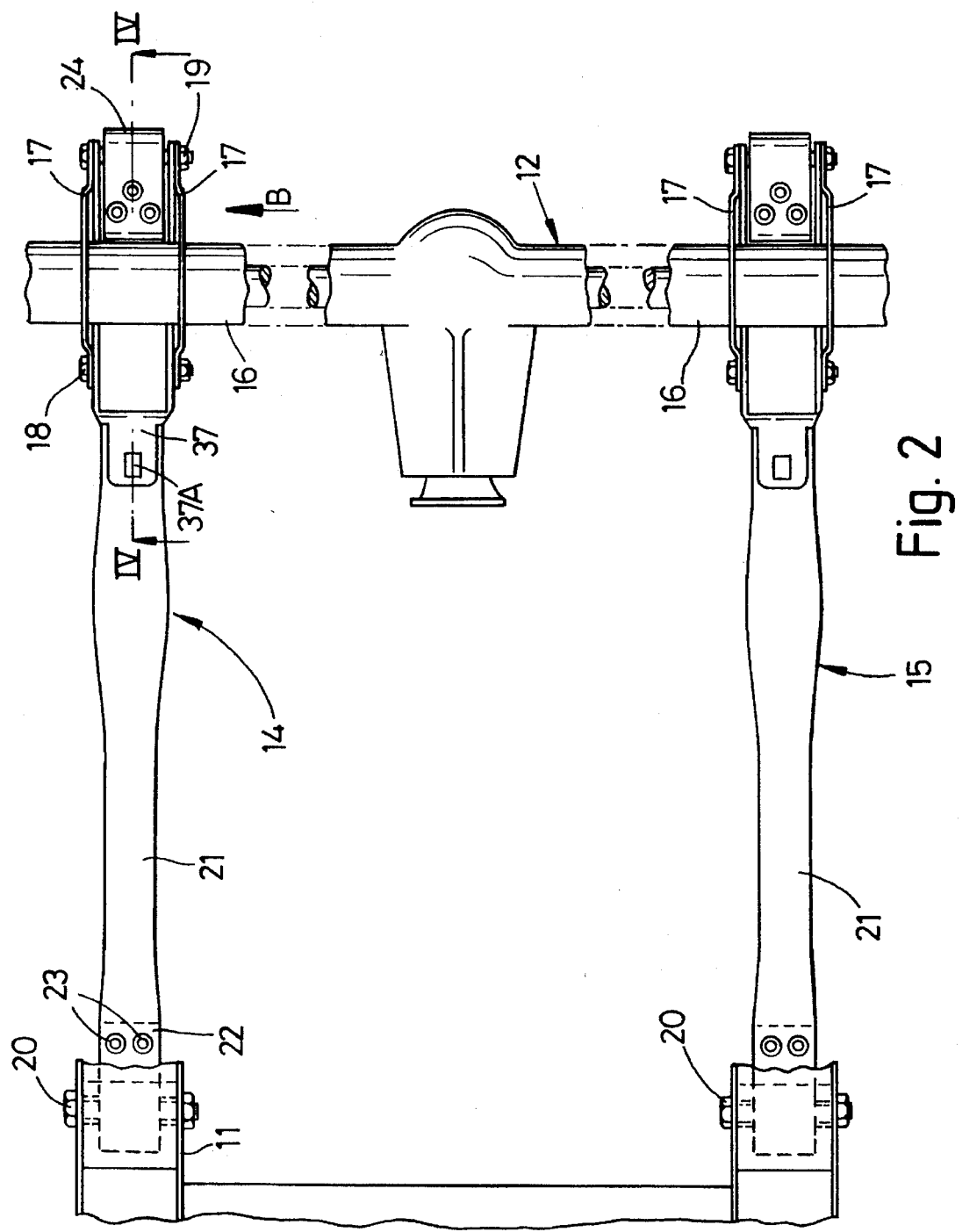
FIG. 2 is a view in the direction of arrow A in FIG. 1, omitting certain components.
Figure 3:
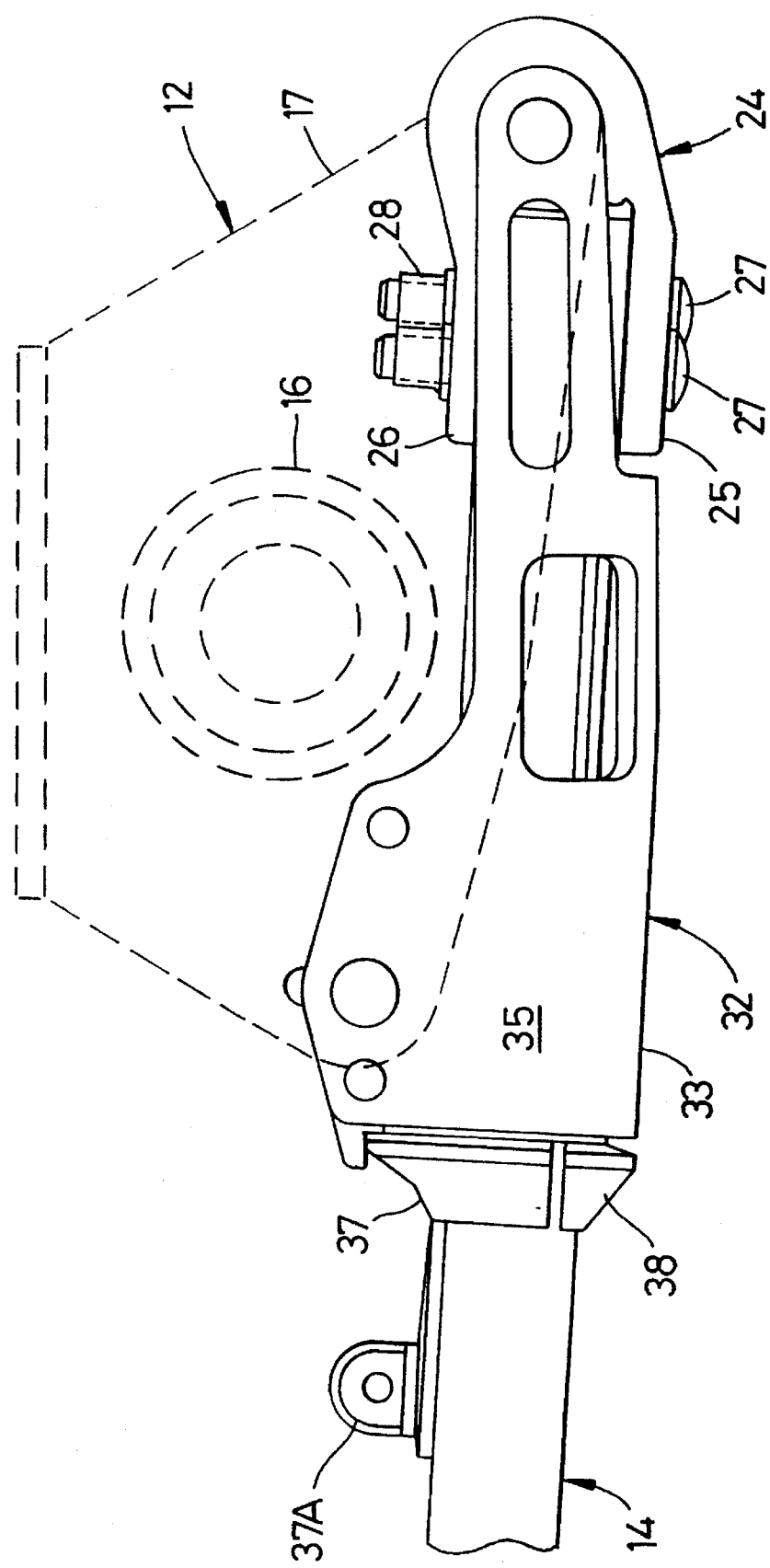
FIG. 3 is an enlarged view in the direction of arrow B in FIG. 2 with certain components omitted or shown in ghost.
Figure 4:
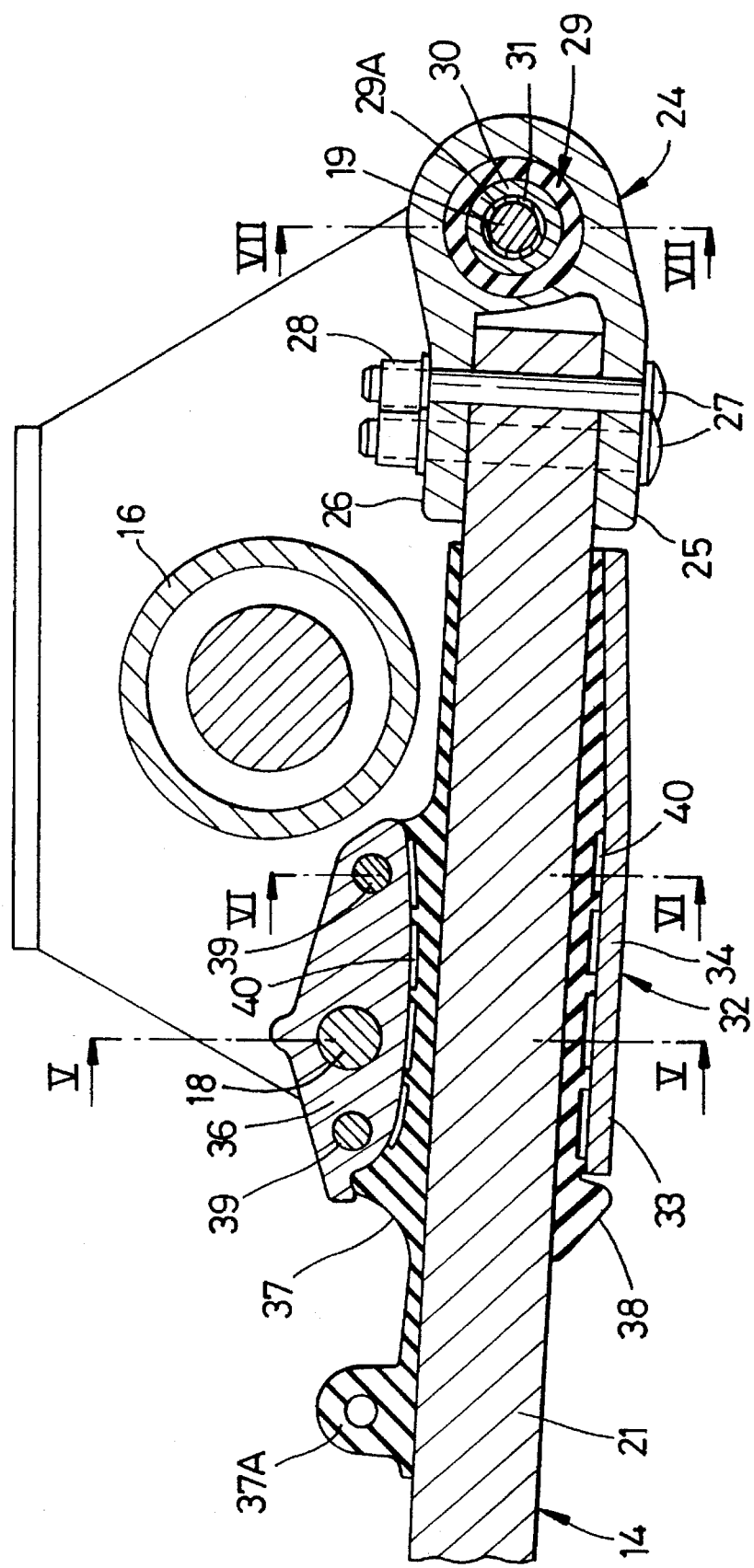
FIG. 4 is a cross-section on the line IV—IV in FIG. 2.
Figure 5:
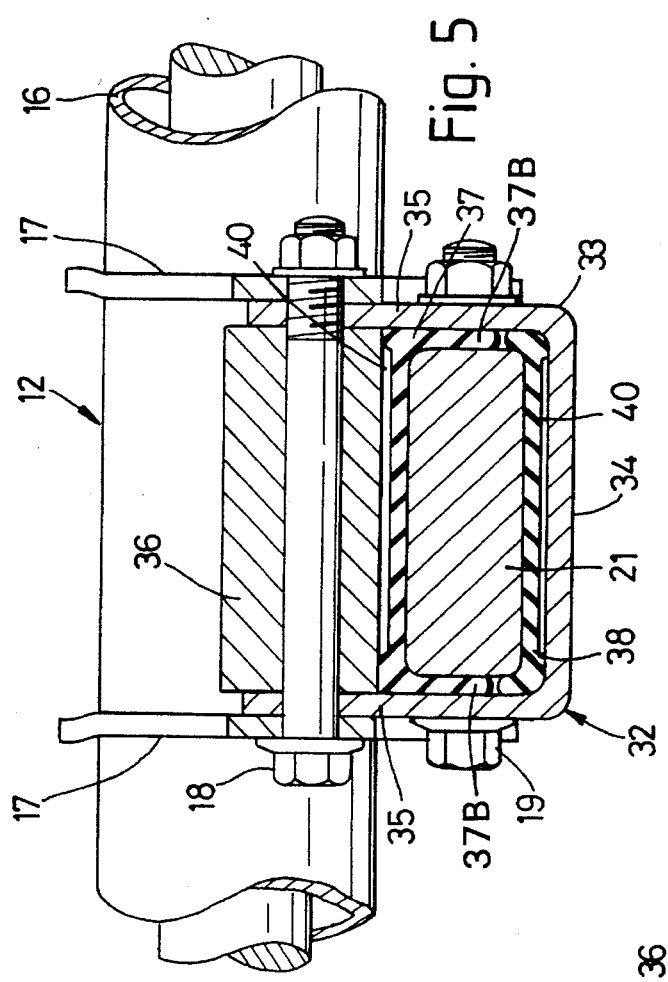
FIG. 5 is a cross-section on the line V—V in FIG. 4.
Figure 7:
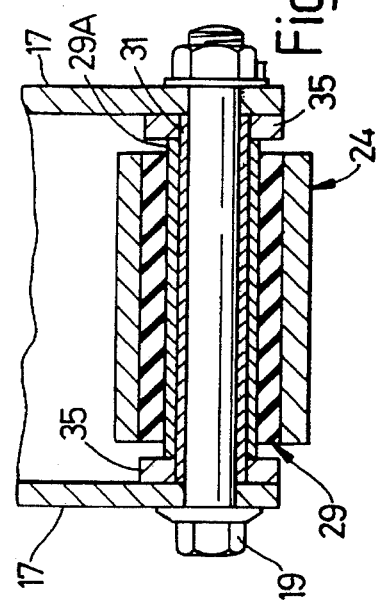
FIG. 7 is a cross-section on the line VII—VII in FIG. 3.
Figure 6:
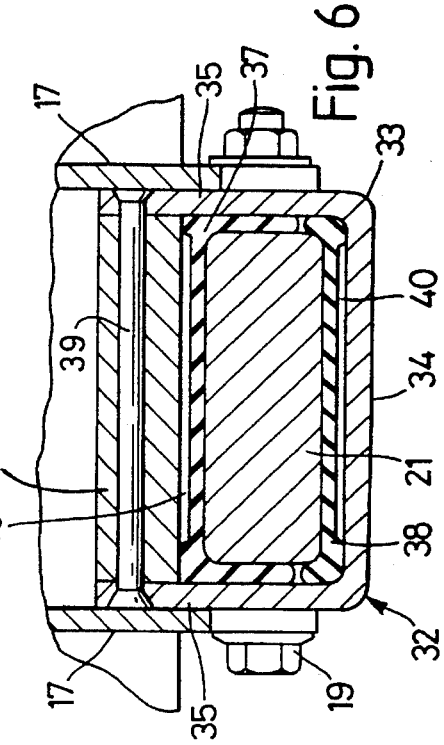
FIG. 6 is a cross-section on the line VI—VI in FIG. 4.

Referring to FIGS. 1 and 2, a vehicle chassis 11 is partially supported by an axle 12 through a pair of air springs 13. Two suspension torque arm assemblies 14 and 15 serve to locate the axle 12 in the fore and aft (longitudinal) direction and to resist braking and driving torque from the axle. A transverse link (Panhard rod) (not shown) locates the axle 12 laterally in a known manner.

The axle 12 comprises an axle tube 16 having two pairs of flanges 17 welded to it. Each pair of flanges 17 flanks a respective torque arm assembly 14 or 15 and each torque arm assembly is secured to the axle 12 by a respective pair of bolts 18 and 19. The torque arm assemblies 14, 15 are substantially identical, so only one will be described in detail. Each torque arm assembly 14, 15 comprises a radius arm 21 of composite construction comprising resin reinforced with glass fibers. One end of each arm 21 is arranged for pivotal attachment to the chassis 11 by means of a respective end fitting 22 secured to the arm by a pair of tensile fasteners 23. Each end fitting 22 carries a resilient bush 22A which is secured to the chassis by a respective bolt 20.

Referring additionally to FIGS. 3 to 8, at the other end of the arm 21 there is another end fitting 24, similar to the end fitting 22. The end fitting 24 is of extruded aluminum alloy and comprises open jaws 25 and 26 which grip the arm 21. The arm 21 and the end fitting 24 are secured by three headed pins 27 which are retained by swaged collars 28. The pins 27 and collars 28 are available as proprietary items (eg from the Huck Manufacturing Co) and when secured using proprietary equipment retain a significant tensile force to ensure that the jaws 25 and 26 grip the arm 21 under all operational loading conditions.

The end fitting 24 includes a resilient bushing 29 comprising a sleeve of rubber or other elastomer bonded to a steel bush 29A. The bushing 29 provides resilience between the end fitting and the axle 12. A rigid sleeve in the form of a steel rollpin 31 extends through the steel bush 29A and provides a hole for the bolt 19.

A clamp assembly 32 is clamped to the arm 21 so as to apply a clamp load to the arm along a length L (FIG. 8) of the arm spaced from the end fitting 24. The clamp assembly 32 comprises a first or lower U-section, clamp member 33 having a base portion 34 and a pair of side flanges 35 and a second or upper clamp member 36 in the form of a generally triangular section aluminum alloy extrusion nesting between the side flanges.

An upper pad 37 and a lower pad 38 of rubber or other elastomeric material are both bonded to the arm 21 to provide resilient cushioning between the clamp assembly 32 and the arm. The upper pad 37 includes a lug 32A which provides a connection for a link to a height sensor (not shown) used as part of a control system for the air springs 13. Also included in the upper pad 37 are side flanges 37B which help to protect the arm prior to and during fitting of the clamp assembly 32. The pads 37 and 38 each have pockets 40 in their surfaces facing away from the arm 21 to help control the degree of resilience and extend towards the end fitting 24 to protect the arm 14 from mechanical abrasion in service, eg. from road debris, mud and stones.

Figure 8:
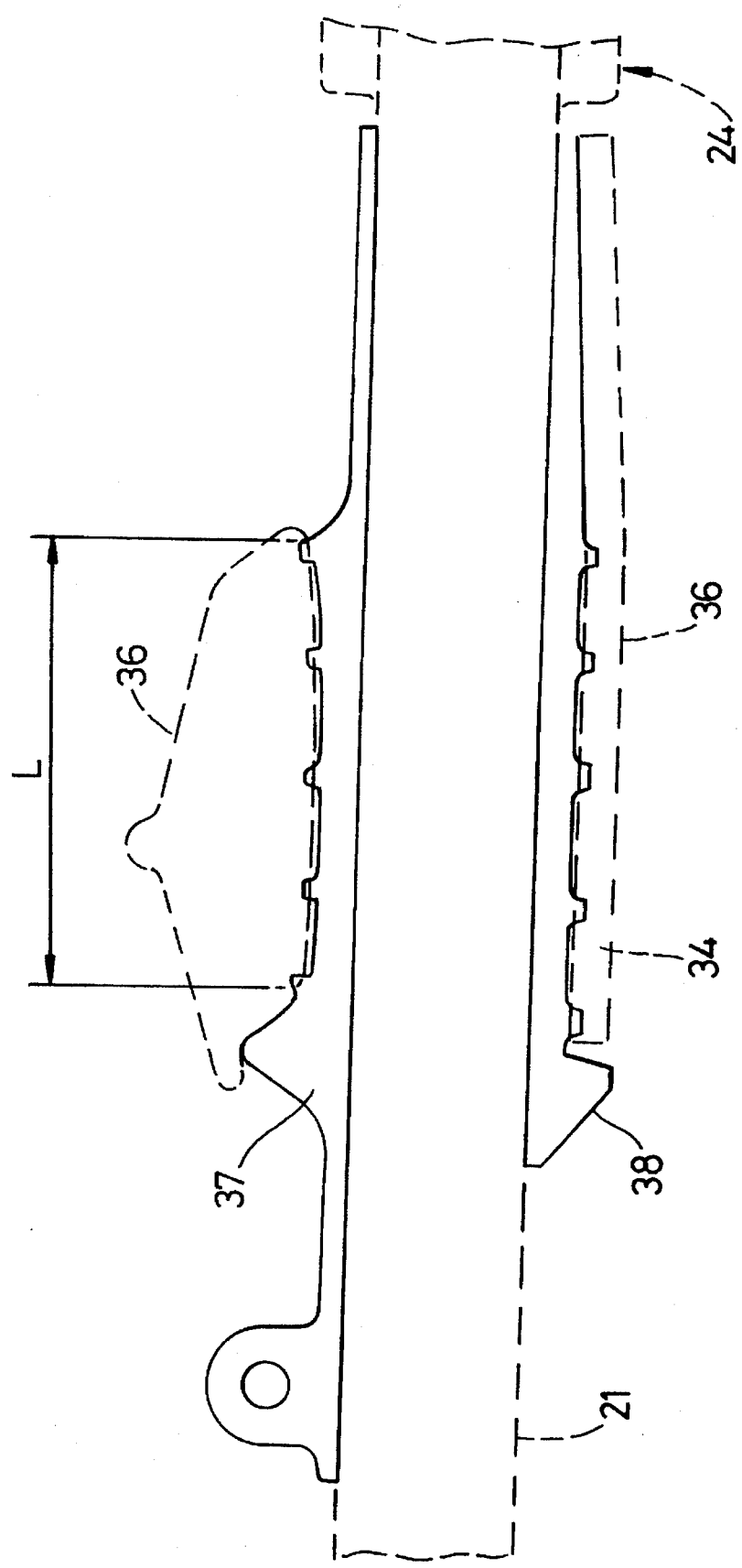
FIG. 8 is a diagrammatic view corresponding to FIG. 4 showing certain rubber components in their free state prior to compression.

The upper clamp member 36 is secured to the side flanges by a pair of countersunk rivets 39 so that the pads 37 and 38 are both placed under compression, as illustrated by FIG. 8 where the pads are shown in their free state with the clamp members 33 and 36 shown in chain dotted outline. Thus the base portion 34 of the lower clamp member 33 applies a clamp load to the arm 21 through the lower pad 38, the clamp load being reacted by an equal and opposite clamp load applied by the base surface 41 of the upper clamp member 36 acting through the upper pad 37. The countersunk rivets 39 act as retaining means to resist movement between the side flanges 35 and the upper clamp member and so retain the clamp load.

The side flanges 35 and the upper clamp member 36 have holes providing a through bore for bolt 18. Thus the torque arm assembly 14 is fastened to the axle at a first position on the axle at bolt 19 and at a second position on the axle spaced from the first position at bolt 18. The side flanges 35 extend to flank the end fitting 24 so that in use the clamp assembly 32 is fastened to the axle 12 at the second position by the bolt 18.

The side flanges 35 are also connected to the end fitting 24 by virtue of the roll pin 31 extending into corresponding holes in the side flanges. The roll pin 31 is an interference fit in the steel bush 29A and the side flanges 35 and hence is captive in the torque arm assembly.

The clamp assembly 32 clamps the arm 21 over the length L of the arm 21 which is largely determined by the preloaded areas of the pads 37,38. Hence the load on the arm at the position of maximum bending moment in the arm is spread over an area and undue stress concentration is avoided. This pending moment is minimized by the spacing of the end fitting 24 from the length L of the arm 21 over which the clamp load is spread.

It will be appreciated that the torque arm assemblies 14, 15 are in use subject to considerable stresses. Not only do they have to resist braking and driving forces, as previously discussed, but they are also subject to additional bending stresses due to weight transfer during vehicle cornering and due to axle articulation when traversing uneven surfaces. Under these conditions, one end of the axle 12 moves vertically relative to the other, which places opposite bending stresses on the arms 21. The arms 21 being of composite material, can flex and exert a restoring moment or couple in a manner similar to a conventional anti-roll bar.

The composite arms 21 are much lighter than the steel forgings previously known for the torque arms of off road vehicles so that this factor and the ability to dispense with or reduce the weight of a conventional anti-roll bar enables unsprung weight to be greatly reduced compared to the known design.

The torque arm assemblies 14 and 15 are pre-assembled using the roll pins 31 and countersunk rivets 39 prior to fitting to the axle 12 by the bolts 18 and 19. Thus the clamp assembly 32 protects the arm 21 prior to and during vehicle assembly and complete torque arm assemblies can be supplied as replacement spares which do not need special skills, tools or equipment to fit. This ensures the maximum protection for the arm 21 over its most highly stressed area.

Alternative cross sections for the arm may be used and it may not be of uniform cross-section over its length. Alternative fibers may be used, e.g. carbon or Kevlar (trade mark).

We claim:

1. In a vehicle having a chassis, an axle and a pair of laterally spaced torque arm assemblies connecting the axle to the chassis and arranged longitudinally of the vehicle;

each suspension torque arm assembly comprises:

a composite arm having one end and another end, said one end being arranged for pivotal attachment to the vehicle chassis; an end fitting at said other end of the arm for attaching the arm to the axle at a first position on the axle;

and a clamp assembly clamped to the arm so as to apply a clamp load to the arm along a length of the arm spaced from the end fitting and arranged to be fastened to the axle at a second position on the axle spaced from the first position, the clamp assembly including a clamp member which extends to flank the end fitting so that in use the clamp assembly is fastened to the axle at said first position and the clamp assembly is prevented from pivoting on the axle.

2. A torque arm assembly according to claim 1, wherein resilient cushioning is provided between the clamp assembly and the arm.

3. A torque arm assembly according to claim 2, wherein the resilient cushioning comprises pads of elastomeric material.

4. A torque arm assembly according to claim 3, wherein the pads are bonded to the arm.

5. A torque arm assembly according to claim 1, wherein the clamp member is a first U-section, clamp member having a base portion to apply the clamp load to the arm and a pair of side flanges and the clamp assembly further comprises a second clamp member nesting between the side flanges and having a base surface for applying the clamp load and retaining means securing the second clamp member to the first clamp member thereby preventing lateral movement between the flanges and the second clamp member and retaining the clamp load.

6. A torque arm assembly according to claim 5, wherein a through bore is provided in the side flanges and the second clamp member for a fastener connecting the torque arm assembly to the axle at said second position.

7. A torque arm assembly according to claim 5, wherein the side flanges extend to flank the end fitting and are connected thereto.

8. A torque arm assembly according to claim 7, wherein the end fitting includes a resilient bushing for providing resilience between the end fitting and the axle.

9. A torque arm assembly according to claim 7, wherein the end fitting includes a resilient bushing for providing resilience between the end fitting and the axle and a rigid sleeve extends through the side flanges and the resilient bushing and provides a hole for a fastener which in use connects the torque arm assembly to the axle at said first position.

10. A torque arm assembly according to claim 8, wherein the rigid sleeve is captive in the torque arm assembly.

11. A torque arm assembly according to claim 9, wherein the rigid sleeve is an interference fit in the torque arm assembly.

12. In a vehicle having a chassis, an axle and a pair of laterally spaced torque arm assemblies connecting the axle to the chassis and arranged longitudinally of the vehicle;

each suspension torque arm assembly comprises:

a composite arm having one end and another end, said one end being arranged for pivotal attachment to the vehicle chassis;

an end fitting at said other end of the arm for attaching the arm to the axle at a first position on the axle; and a clamp assembly clamped to the arm so as to apply a clamp load to the arm along a length of the arm spaced from the end fitting and arranged to be fastened to the axle at a second position on the axle spaced from the first position, the clamp assembly comprising a first, U-section, clamp member having a base portion to apply the clamp load to the arm and a pair of side flanges, a second clamp member nesting between the side flanges and having a base surface for applying the clamp load and retaining means securing the second clamp member to the first clamp member thereby preventing lateral movement between the flanges and the second clamp member and retaining the clamp load, the side flanges and the second clamp member defining a through bore for a fastener connecting the torque arm assembly to the axle at said second position.

13. A torque arm assembly according to claim 12, wherein the side flanges extend to flank the end fitting so that in use the clamp assembly is fastened to the axle at said first position.

14. A torque arm assembly according to claim 12, wherein the side flanges are connected to the end fitting.

15. A torque arm assembly according to claim 14, wherein the end fitting includes a resilient bushing for providing resilience between the end fitting and the axle.

16. A torque arm assembly according to claim 14, wherein the end fitting includes a resilient bushing for providing resilience between the end fitting and the axle and a rigid sleeve extends through side flanges and the resilient bushing and provides a hole for a fastener which in use connects the torque arm assembly to the axle at said first position.

17. A torque arm assembly according to claim 16, wherein the rigid sleeve is captive in the torque arm assembly.

18. A torque arm assembly according to claim 17, wherein the rigid sleeve is an interference fit in the torque arm assembly.

19. In a vehicle having a chassis, an axle and a pair of laterally spaced torque arm assemblies connecting the axle to the chassis and arranged longitudinally of the vehicle; each suspension torque arm assembly comprises:

a composite arm having one end and an other end, said one end being arranged for pivotal attachment to the vehicle chassis;

an end fitting at said other end of the arm for attaching the arm to the axle at a first position on the axle; and a clamp assembly clamped to the arm so as to apply a clamp load to the arm along a length of the arm spaced from the end fitting and arranged to be fastened to the axle at a second position on the axle spaced from the first position, the clamp assembly comprising a first, U-section, clamp member having a base portion to apply the clamp load to the arm and a pair of side flanges, a second clamp member nesting between the side flanges and having a base surface for applying the clamp load and retaining means securing the second clamp member to the first clamp member thereby preventing lateral movement between the flanges and the second clamp member and retaining the clamp load, the side flanges extending to flank the end fitting so that in use the clamp assembly is fastened to the axle at said first position.

20. A torque arm assembly according to claim 19, wherein the side flanges are connected to the end fitting.

21. A torque arm assembly according to claim 20, wherein the end fitting includes a resilient bushing for providing resilience between the end fitting and the axle and a rigid sleeve extends through the side flanges and the resilient bushing and provides a hole for a fastener which in use connects the torque arm assembly to the axle at said first position.

22. A torque arm assembly according to claim 21, wherein the rigid sleeve is captive in the torque arm assembly.

23. A torque arm assembly according to claim 22, wherein the rigid sleeve is an interference fit in the torque arm assembly.

24. A torque arm assembly according to claim 19, wherein the end fitting includes a resilient bushing for providing resilience between the end fitting and the axle.

* * * * *